United States Patent
Kao et al.

(10) Patent No.: US 11,295,363 B1
(45) Date of Patent: *Apr. 5, 2022

(54) SYSTEMS AND METHODS FOR FACILITATING PURCHASE OFFER SELECTION ACROSS MULTIPLE ONLINE SALES PLATFORMS

(71) Applicant: Mythical, Inc., Sherman Oaks, CA (US)

(72) Inventors: Liwen Kao, Pasadena, CA (US); Rudy Koch, Seattle, WA (US); Cameron Thacker, Sherman Oaks, CA (US); Andrew Royer, Los Angeles, CA (US)

(73) Assignee: Mythical, Inc., Sherman Oaks, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 16/808,923

(22) Filed: Mar. 4, 2020

(51) Int. Cl.
*G06Q 30/00* (2012.01)
*G06Q 30/06* (2012.01)
(Continued)

(52) U.S. Cl.
CPC ....... *G06Q 30/0611* (2013.01); *G06Q 20/123* (2013.01); *G06Q 30/0605* (2013.01);
(Continued)

(58) Field of Classification Search
CPC .... G06Q 30/08; G06Q 20/10; G06Q 20/3678; G06Q 30/0609; G06Q 30/0611; G06Q 30/0617; G06Q 2220/00; G06Q 30/0641; G06Q 30/0625; G06Q 20/405; G06Q 20/381; G06Q 20/127; G06Q 20/065;
(Continued)

(56) References Cited

U.S. PATENT DOCUMENTS 6,085,169 A 7/2000 Walker
8,052,520 B2 11/2011 Park
(Continued)

OTHER PUBLICATIONS

Game X coin launches first blockchain game platform: Korea-based startup aims to disrupt the video game industry with game cryptocurrency. (Aug. 2, 2018). NASDAQ OMX's News Release Distribution Channel Retrieved from https://search.proquest.com/wire-feeds/game-x- coin-launches-first-blockchain-platfor (Year: 2018).*

(Continued)

*Primary Examiner* — Kathleen Palavecino
(74) *Attorney, Agent, or Firm* — Esplin & Associates, PC

(57) ABSTRACT

Systems and methods for facilitating purchase offer selection across multiple online sales platforms are disclosed. Exemplary implementations may: obtain first information defining a first sales listing of a particular virtual item on a first online sales platform; obtain second information defining a second sales listing of the particular virtual item on a second online sales platform; receive at least two indications of offers to purchase the particular virtual item; obtain information that represents at least one sales characteristic by which the offers to purchase the particular virtual item are to be ranked according to desirability; determine and compare a first metric value for the first offer and a second metric value for the second offer; and determine an accepted offer that is accepted based on the comparison.

20 Claims, 3 Drawing Sheets

(51) Int. Cl.
*G06Q 20/12* (2012.01)
*G06Q 20/06* (2012.01)

(52) U.S. Cl.
CPC ....... *G06Q 30/0609* (2013.01); *G06Q 20/065* (2013.01); *G06Q 2220/00* (2013.01)

(58) Field of Classification Search
CPC .. G06Q 20/123; G06Q 30/0605; A63F 13/79; A63F 13/58; G06F 16/2315; G06F 16/27
See application file for complete search history.

(56) References Cited

U.S. PATENT DOCUMENTS

| | | | |
|---|---|---|---|
| 10,692,325 B2 | 6/2020 | Simons | |
| 10,740,733 B2 | 8/2020 | Moir | |
| 10,850,202 B1 | 12/2020 | Koch | |
| 10,861,095 B1 | 12/2020 | Koch | |
| 10,872,367 B1 | 12/2020 | Stoddard | |
| 10,946,291 B1* | 3/2021 | Harris | A63F 13/352 |
| 10,984,400 B1 | 4/2021 | Koch | |
| 11,062,284 B1 | 7/2021 | Cunningham | |
| 11,138,580 B1 | 10/2021 | Koch | |
| 2002/0123938 A1 | 9/2002 | Yu | |
| 2004/0266505 A1 | 12/2004 | Keam | |
| 2007/0087831 A1* | 4/2007 | Van Luchene | A63F 13/792 463/42 |
| 2008/0220876 A1 | 9/2008 | Mehta | |
| 2011/0302037 A1 | 12/2011 | Sutton-Shearer | |
| 2012/0015699 A1 | 1/2012 | Kalvachev | |
| 2012/0015726 A1 | 1/2012 | Busey | |
| 2012/0030069 A1 | 2/2012 | Garg | |
| 2013/0110720 A1 | 5/2013 | Rekhi | |
| 2014/0335948 A1 | 11/2014 | Jung | |
| 2015/0170112 A1* | 6/2015 | DeCastro | G06Q 20/381 705/39 |
| 2016/0292680 A1* | 10/2016 | Wilson, Jr | G06Q 20/40 |
| 2017/0083959 A1 | 3/2017 | Bousis | |
| 2017/0148264 A1 | 5/2017 | Pichette | |
| 2018/0078843 A1 | 3/2018 | Tran | |
| 2018/0114403 A1 | 4/2018 | Jayachandran | |
| 2018/0117447 A1 | 5/2018 | Tran | |
| 2018/0204260 A1* | 7/2018 | McGregor | G06Q 30/0613 |
| 2018/0205740 A1 | 7/2018 | Clark | |
| 2018/0247191 A1 | 8/2018 | Katz | |
| 2018/0276630 A1 | 9/2018 | Kim | |
| 2019/0005595 A1 | 1/2019 | Tautenhan | |
| 2019/0205873 A1 | 7/2019 | Kamalsky | |
| 2019/0220836 A1 | 7/2019 | Caldwell | |
| 2019/0236605 A1 | 8/2019 | Mchale | |
| 2019/0282906 A1 | 9/2019 | Yong | |
| 2019/0295371 A1 | 9/2019 | Simons | |
| 2019/0299105 A1 | 10/2019 | Knight | |
| 2019/0303892 A1 | 10/2019 | Yantis | |
| 2019/0311341 A1 | 10/2019 | Rice | |
| 2019/0340623 A1 | 11/2019 | Rivkind | |
| 2019/0354945 A1* | 11/2019 | Mahajan | H04L 9/3239 |
| 2019/0361917 A1 | 11/2019 | Tran | |
| 2019/0386969 A1 | 12/2019 | Verzun | |
| 2020/0005284 A1 | 1/2020 | Vijayan | |
| 2020/0013048 A1 | 1/2020 | Love | |
| 2020/0026548 A1 | 1/2020 | Huang | |
| 2020/0074853 A1 | 3/2020 | Miller | |
| 2020/0097927 A1 | 3/2020 | Groarke | |
| 2020/0184041 A1 | 6/2020 | Andon | |
| 2020/0202668 A1* | 6/2020 | Cotta | G07F 17/3234 |
| 2020/0211092 A1 | 7/2020 | Sarin | |
| 2020/0273048 A1 | 8/2020 | Andon | |
| 2020/0320623 A1* | 10/2020 | McGrath | G06Q 50/188 |
| 2020/0360815 A1 | 11/2020 | Eatedali | |
| 2021/0073881 A1 | 3/2021 | Stoddard | |
| 2021/0118085 A1 | 4/2021 | Bushnell | |
| 2021/0129028 A1 | 5/2021 | Eatedali | |
| 2021/0279695 A1 | 9/2021 | Rice | |
| 2021/0342831 A1 | 11/2021 | Jeong | |
| 2022/0032200 A1 | 2/2022 | Koch | |
| 2022/0036456 A1 | 2/2022 | Koch | |

OTHER PUBLICATIONS

Siira, Erkki, et al. "Designing and Implementing Common Market for Cross-Game Purchases between Mobile Games." Bled eConference. 2017.*
Zheng Qin, "Introduction to E-commerce", 2009, Springer, springer.com (Year: 2009), pp. 298-301.
Game X coin launches first blockchain game platform: Korea-based startup aims to disrupt the video game industry with game cryptocurrency. (Aug. 2, 2018). NASDAQ OMX's News Release Distribution Channel (Year: 2018) Retrieved from https://search.proquest.com/wire-feeds/game-x-coin-launches-first-blockchain-platform/docview20/81459699/se-2?accountid=14753 (Year: 2018) (2 pages).
Janice Podsada; "With Sales of Virtual Goods, The Reality Is Serious Revenue"; Jan. 7, 2009; Tribune Content Agency LLC (Year: 2009) (3 pages).
Wowpedia, "Auction House" published Feb. 22, 2020, available at https://wowpedia.fandom.com/wiki/Auction_House?oldid=5624964. (Year: 2020).
"Wowhead's Guide on How to Play World of Warcraft," published Aug. 29, 2018, available at https://web.archive.org/web/20190201051143/https://www.wowhead.com/how-to-play-world-of-warcraft. (Year: 2018).

* cited by examiner

SYSTEMS AND METHODS FOR FACILITATING PURCHASE OFFER SELECTION ACROSS MULTIPLE ONLINE SALES PLATFORMS

FIELD OF THE DISCLOSURE

The present disclosure relates to systems and methods for facilitating purchase offer selection across multiple online sales platforms, for offers to purchase virtual items, the virtual items being useable within an online game.

BACKGROUND

Selling and buying virtual items that are usable within an online game is known. Selling and buying objects on an online sales platform is known.

SUMMARY

One aspect of the present disclosure relates to a system configured for facilitating purchase offer selection across multiple online sales platforms, for offers to purchase virtual items, the virtual items being useable within an online game. The system may include one or more hardware processors configured by machine-readable instructions. The processor(s) may be configured to manage user accounts for users in the online game. Individual user accounts may be associated with individual users. The individual user accounts may include individual user inventories of virtual items that are usable within the online game by the associated users. The users may include a selling user associated with a selling user account and a buying user associated with a buying user account. The selling user account may include a selling user inventory of one or more virtual items that are usable by the selling user within the online game. The processor(s) may be configured to obtain first information defining a first sales listing of a particular virtual item on a first online sales platform. The first online sales platform may be configured to allow buyers to make purchases using a fiat currency. The first information further defines first pricing information for prospective buying users and first descriptive information that describes the particular virtual item offered for sale for the first sales listing. The processor(s) may be configured to obtain second information defining a second sales listing of the particular virtual item on a second online sales platform. The second online sales platform may be configured to allow buyers to make purchases using a cryptocurrency. The second information further defines second pricing information for prospective buying users and second descriptive information that describes the particular virtual item offered for sale for the second sales listing. The processor(s) may be configured to receive at least two indications of offers to purchase the particular virtual item. The at least two indications of the offers may include a first indication of a first offer received through the first online sales platform from a first prospective buying user and a second indication of a second offer received through the second online sales platform from a second prospective buying user. The processor(s) may be configured to obtain information that represents at least one sales characteristic by which the offers to purchase the particular virtual item are to be ranked according to desirability. The processor(s) may be configured to determine, for the first offer, a first metric value of an offer desirability metric that quantifies desirability of offers to purchase the particular virtual item. The first metric value may be determined in accordance with the at least one sales characteristic. The processor(s) may be configured to determine, for the second offer, a second metric value of the offer desirability metric. The second metric value may be determined in accordance with the at least one sales characteristic. The processor(s) may be configured to compare the first metric value with the second metric value. The processor(s) may be configured to determine an accepted offer that is accepted. The accepted offer may be based on the comparison of the first metric value with the second metric value. The accepted offer may be either the first offer or the second offer. The processor(s) may be configured to effectuate transmissions of notifications to the first prospective buying user and the second prospective buying user that represent whether their respective offers have been accepted. The processor(s) may be configured to receive an amount of consideration from the buying user. The buying user account may include a buying user inventory. The processor(s) may be configured to effectuate assignment of the ownership of the particular virtual item to the buying user account, such that the particular virtual item is included in the buying user inventory. The processor(s) may be configured to transfer at least a portion of the amount of consideration received from the buying user to the selling user account.

Another aspect of the present disclosure relates to a method for facilitating purchase offer selection across multiple online sales platforms, for offers to purchase virtual items, the virtual items being useable within an online game. The method may include managing user accounts for users in the online game. Individual user accounts may be associated with individual users. The individual user accounts may include individual user inventories of virtual items that are usable within the online game by the associated users. The users may include a selling user associated with a selling user account and a buying user associated with a buying user account. The selling user account may include a selling user inventory of one or more virtual items that are usable by the selling user within the online game. The method may include obtaining first information defining a first sales listing of a particular virtual item on a first online sales platform. The first online sales platform may be configured to allow buyers to make purchases using a fiat currency. The first information further defines first pricing information for prospective buying users and first descriptive information that describes the particular virtual item offered for sale for the first sales listing. The method may include obtaining second information defining a second sales listing of the particular virtual item on a second online sales platform. The second online sales platform may be configured to allow buyers to make purchases using a cryptocurrency. The second information further defines second pricing information for prospective buying users and second descriptive information that describes the particular virtual item offered for sale for the second sales listing. The method may include receiving at least two indications of offers to purchase the particular virtual item. The at least two indications of the offers may include a first indication of a first offer received through the first online sales platform from a first prospective buying user and a second indication of a second offer received through the second online sales platform from a second prospective buying user. The method may include obtaining information that represents at least one sales characteristic by which the offers to purchase the particular virtual item are to be ranked according to desirability. The method may include determining, for the first offer, a first metric value of an offer desirability metric that quantifies desirability of offers to purchase the particular virtual item. The first metric value may be determined in accordance with the at least one sales characteristic. The method may include determining, for the second offer, a second metric value of the offer desirability metric. The second metric value may be determined in accordance with the at least one sales characteristic. The method may include comparing the first metric value with the second metric value. The method may include determining an accepted offer that is accepted. The accepted offer may be based on the comparison of the first metric value with the second metric value. The accepted offer may be either the first offer or the second offer. The method may include effectuating transmissions of notifications to the first prospective buying user and the second prospective buying user that represent whether their respective offers have been accepted. The method may include receiving an amount of consideration from the buying user. The buying user account may include a buying user inventory. The method may include effectuating assignment of the ownership of the particular virtual item to the buying user account, such that the particular virtual item is included in the buying user inventory. The method may include transferring at least a portion of the amount of consideration received from the buying user to the selling user account.

As used herein, any association (or relation, or reflection, or indication, or correspondency) involving servers, processors, client computing platforms, virtual items, users, accounts, inventories, requests, sales, purchases, currencies, sales platforms, listings, publications, presentations, indications, offers, sales characteristics, metrics, metric values, determinations, verifications, notifications, acceptances, assignments, transfers, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
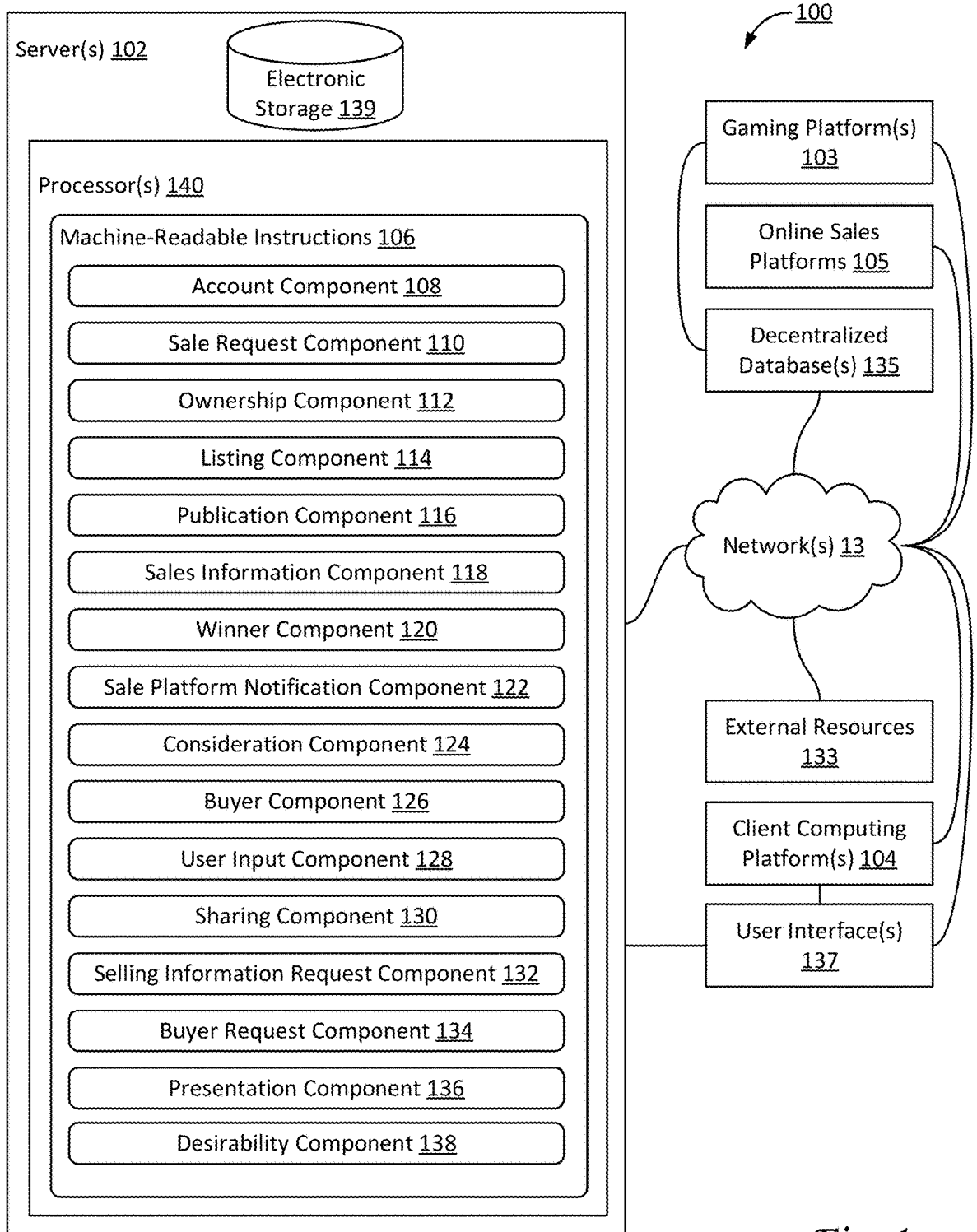
FIG. 1 illustrates a system configured for facilitating purchase offer selection across multiple online sales platforms, in accordance with one or more implementations.

FIG. 1 illustrates a system 100 configured for buying and selling virtual items through multiple online sales platforms 105, in accordance with one or more implementations. The virtual items may be useable within an online game. For example, the online game may be provided and/or hosted by one or more gaming platforms 103. In some implementations, system 100 may include one or more servers 102, one or more processors 140, electronic storage 139, one or more client computing platforms 104, one or more gaming platforms 103, online sales platforms 105, one or more decentralized databases 135, one or more user interfaces 137, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

The users may include one or more selling users, one or more buying users, and/or other users. For example, the users may include a first selling user, a second selling user, a first buying user, a second buying user, a first user, a second user, a third user, and so forth. As used herein, a buying user may be a prospective buying user.

Server(s) 102 may be configured by machine-readable instructions 106. Machine-readable instructions 106 may include one or more instruction components. The instruction components may include computer program components. The instruction components may include one or more of account component 108, sale request component 110, ownership component 112, listing component 114, publication component 116, sales information component 118, winner component 120, sale platform notification component 122, consideration component 124, buyer component 126, user input component 128, sharing component 130, selling information request component 132, buyer request component 134, presentation component 136, desirability component 138, and/or other instruction components.

Account component 108 may be configured to manage user accounts for users, including but not limited to the users in an online game. In some implementations, account component 108 may be configured to manage user inventories for users, including but not limited to the users in an online game. Individual ones of the user accounts may be associated with individual ones of the users. For example, a selling user account may be associated with a selling user (also referred to as a seller), a buying user account may be associated with a buying user (also referred to as a buyer), a first user account may be associated with a first user, a second user account may be associated with a second user, and so forth. The individual ones of the user accounts may include individual user inventories of virtual items that are usable within the online game by the associated users. For example, the selling user account may include a selling user inventory, the buying user account may include a buying user inventory, the first user account may include a first user inventory, the second user account may include a second user inventory, and so forth. The virtual items included in an inventory may include virtual objects, characters, avatars, skills, abilities, virtual and/or other currency, virtual content of the online game, access rights within the online game, rights to (future) benefits within the online game, and/or other valuables within the online game. In some implementations, individual user accounts may be specific to a particular online game. In some implementations, individual user accounts may be managed in the context of one or more gaming platforms 103.

In some implementations, account component 108 may be configured to manage user accounts in one or more online sales platforms 105. In some implementations, account component 108 may be configured to facilitate a link or connection between user accounts of users within the online game, user accounts within gaming platforms 103, user accounts within online sales platforms 105, and/or other user accounts.

Sale request component 110 may be configured to receive requests from users, including but not limited to sales requests that indicates users will be offering for sale particular virtual items from their inventories through at least two online sales platforms 105 simultaneously. In some implementations, a request may involve a modification in the ownership of one or more virtual items. The at least two online sales platforms 105 may include a first online sales platform that allows buyers to make purchases using a fiat currency. In some implementations, the at least two online sales platforms 105 may include a second online sales platform that allows buyers to make purchases using a cryptocurrency. In some implementations, the at least two online sales platforms 105 may include a third online sales platform that allows buyers to make purchases using a virtual currency. In some implementations, the at least two online sales platforms 105 may include other online sales platforms that allows buyers to make purchases using multiple currencies and/or combinations or currencies. In some implementations, the first online sales platform may not allow buyers to make purchases using a cryptocurrency. In some implementations, the second online sales platform may not allow buyers to make purchases using a fiat currency. In some implementations, the third online sales platform may not allow buyers to make purchases using a cryptocurrency. Examples of a fiat currency may include U.S. dollars, euros, Japanese yen, and/or other currencies. Examples of a cryptocurrency may include Bitcoin, Litecoin, Ether, Ripple, EOS, and/or other currencies. Examples of a virtual currency may include virtual coins, virtual gems, virtual points, and/or other virtual objects. As used herein, auctions may be considered a type of sale. In some implementations, the at least two online sales platforms 105 may include an online sales platform 105 that allows buyers to make purchases using a virtual currency, such as an in-game or in-platform currency.

In some implementations, a particular user may offer a virtual item for sale if the particular user owns the virtual item and/or if the particular owner owns the right to sell the virtual item (or the right to offer the virtual item for sale). In some implementations, ownership of virtual items may be established by and/or based on the virtual items being included in particular inventories. In some implementations, ownership of virtual items may be established by and/or based on assignment of the ownership to particular user accounts and/or inventories. In some implementations, ownership of virtual items may be recorded in a digital ledger, decentralized database, blockchain, and/or other mechanism that includes electronic storage. For example, assignments of the ownership of the particular virtual item may be recorded on decentralized database 135 that stores a registry of assets and transactions. In some implementations, the assets of decentralized database 135 may include the particular virtual item. In some implementations, ownership of the particular virtual item may be assigned, prior to a sale, to the selling user account. This may be referred to as the seller owning the particular virtual item. In some implementations, decentralized database 135 may implement a blockchain.

Ownership component 112 may be configured to determine, assign, and/or otherwise modify ownership of virtual items, including but not limited to virtual items that are usable within one or more online games. For example, ownership component 112 may be configured to assign the ownership of a particular virtual item to a particular user account. In some implementations, modifications of ownership may be temporary. For example, ownership component 112 may be configured to assign the ownership of a particular virtual item temporarily to a holding account. For example, the holding account may be not associated with (and/or otherwise under control of) user accounts such as a selling user account or a buying user account. In some implementations, the holding account may hold virtual items in escrow during transactions between users. In some implementations, assigning the ownership of the particular virtual item temporarily to the holding account may be performed such that the selling user is further unable to transfer, sell, and/or otherwise use the particular virtual item within the online game (e.g., at least while ownership is assigned to the holding account). This may prevent changes to the particular virtual item during a sales transaction. In some implementations, actions performed by ownership component 112 (e.g., determinations, assignments, and/or modifications) may be performed in response to actions performed by other components of system 100, including but not limited to sale request component 110. In some implementations, the holding account may be an account on a permissioned blockchain. In some implementations, the holding account may be an account of one or more gaming platforms 103. Assignments of the ownership of the particular virtual item may be recorded on decentralized database 135 that stores a registry of assets and transactions. In some implementations, assigning the ownership of the particular virtual item temporarily to the holding account may be performed such that the selling user is henceforth unable to use the particular virtual item within the online game.

In some implementations, ownership component 112 may be configured to effectuate a lock or hold on a particular virtual item that is for sale. For example, by placing a lock or hold on the particular virtual item, the particular virtual item may be safeguarded from being modified and/or destroyed while being listed for sale.

In some implementations, ownership component 112 may be configured to assign the ownership of a particular virtual item to a buying user account, e.g., responsive to receipt of sales information indicating the particular virtual item has been purchased by a buyer. Subsequent to such an assignment, the particular virtual item may be included in a buying user inventory and accessible to be used by the buying user within the online game.

In some implementations, ownership component 112 may be configured to assign the ownership of a particular virtual item to the selling user account, responsive to receipt of sales information indicating the particular virtual item has not been purchased. For example, a seller may have offered the particular virtual item for sale (such that the ownership was assigned to a holding account). Responsive to a determination that the particular virtual item has not been sold (e.g., not sold within some predetermined time period that has expired), ownership component 112 may be configured to assign the ownership back to the selling user account (e.g., from the holding account).

Listing component 114 may be configured to generate and/or prepare sales listings of virtual items for publications on online sales platforms 105, in particular the at least two online sales platforms 105. In some implementations, listing component 114 may be configured to obtain information regarding and/or defining sales listings. Even when a single particular virtual item is intended to be sold (and only sold exactly once to exactly one buyer), listing component 114 may generate different sales listings for publication on different online sales platforms 105; in particular, at least a first sales listing for the first online sales platform 105, and a second sales listing for the second online sales platform 105. The first and second sales listings may be published at the same time (or such that users of both online sales platforms 105 can be presented with the listings at the same time, simultaneously, and/or otherwise concurrently, through one or more user interfaces). The individual sales listings may include pricing information for prospective buying users and descriptive information that describes the particular virtual item. Generating the sales listings of a particular virtual item may include converting price information (e.g., as included in the sales request) to another currency, including but not limited to a fiat currency, a cryptocurrency, a virtual currency, and/or other currencies. In some implementations, a sales listing may include multiple required fields and one or more optional fields or other units of relevant information. In some implementations, one or more fields may be filled automatically, e.g., by listing component 114, based on information received by sale request component 110. In some implementations, a seller may be prompted to provide and/or confirm information for one or more fields such that generation of a particular sales listing may be completed, e.g., through selling information request component 132. The sales listings for a particular virtual item may include a first sales listing for the first online sales platform 105, a second sales listing for the second online sales platform 105, and/or other sales listings for other online sales platforms 105. In some implementations, publication of a particular sales listing may effectuate an auction having a limited duration. In some implementations, an auction may support the use of a target price such that the first offer that meets the target price may be accepted (or may be considered for being accepted by winner component 120), regardless of whether the limited duration has expired. In some implementations, an auction may accept offers for the entirety of the limited duration.

Publication component 116 may be configured to effectuate publications of sales listings on online sales platform 105. In some implementations, a particular sales listing may be published for a limited duration. For example, an auction may have a limited duration. In some implementations, a particular online sales platform 105 may support an Application Programming Interface (API) for the publication of sales listings. In some implementations, one or more online sales platforms 105 may be external to gaming platform 103 and/or system 100. For example, in some implementations, online sales platforms 105 may include one or more of eBay™, Amazon™, Etsy™, and/or another platform that supports online sales transactions. In some implementations, publication component 116 may be configured to effectuate the publications of the sales listings of the particular virtual item on the at least two online sales platforms 105, in accordance with a received sales request. For example, in some implementations, a seller may select on which of the available online sales platforms 105 a particular virtual item will be offered for sale. For example, publication component 116 may be configured to effectuate a first publication of a first sales listing for a particular virtual item on a first online sales platform 105. Additionally, and/or at the same time (or such that users of both online sales platforms 105 can be presented with the listings at the same time, simultaneously, and/or otherwise concurrently, through one or more user interfaces), publication component 116 may be configured to effectuate a second publication of a second sales listing for the same particular virtual item on a second online sales platform 105. In some implementations, publications of sales listings may be effectuated subsequent to a verification whether the selling user has ownership of the particular virtual item.

Presentation component 136 may be configured to effectuate presentations to users. In some implementations, the presentations may include user interfaces 137. In some implementations, the presentations may be presented within or through user interfaces 137. In some implementations, the presentations may be presented within one or more gaming platforms 103 and/or one or more online sales platforms 105. For example, a particular presentation to a buying user (or a user who is a prospective buyer) may include representations of one or more sales listings, e.g., as published by publication component 116. In some implementations, the particular presentation to the buying user may include representations of a first sales listing for a particular virtual item and a second sales listing for the same particular virtual item. In some implementations, the particular presentation may be made in a manner that indicates the first sales listing and the second sales listing pertain to the same particular virtual item. For example, a representation of the first sales listing may be accompanied by a particular shape, object, color, outline, graphical effect, and/or other visual indication that notifies and/or alerts the buying user that the same particular virtual item is also (concurrently) for sale through a different sales listing and/or through a different online sales platform 105. In some implementations, multiple concurrent sales listings for the same particular virtual item may be presented at the same time in the same user interface 137. In some implementations, the visual indication described herein may include an action button and/or other graphical user interface element that, upon being engaged and/or manipulated by a user, effectuates the presentation of additional information to the user regarding additional sales listings for the same particular virtual item.

Sales information component 118 may be configured to receive information from online sales platforms 105, including but not limited to sales information. In some implementations, sales information may include indications of offers and/or attempts to purchase particular virtual items. In some implementations, sales information may include at least two indications of offers and/or attempts to purchase a particular virtual item, from different prospective buyers. In some implementations, sales information may indicate whether a particular sales listing has received a bid and/or other offer. In some implementations, sales information from online sales platform 105 pertaining to a particular sales listing may be received upon expiration of a limited duration that is associated with the particular sales listing. In some implementations, the indications of the offers may include a first indication of a first offer received through first online sales platform 105, a second indication of a second offer received through second online sales platform 105, and/or other indications. In some implementations, sales information may be time-stamped, e.g., according to the moment of receipt by sales information component 118, the moment online sales platforms 105 were notified and/or otherwise alerted by prospective buyers, and/or other particular moments in time. In some implementations, time stamps may allow sales information and/or offers from different prospective buyers to be organized in chronological order.

In some implementations, sales information component 118 may be configured to obtain and/or determine information that represents one or more sales characteristics. In some implementations, sales characteristics may pertain to offers and/or attempts to purchase virtual items. In some implementations, sales characteristics may pertain to prospective transactions between buyers, sellers, and/or third parties. As used herein, a third party is any party besides sellers, buyers, and system 100, including but not limited to online sales platforms 105, gaming platforms 103, entities that levy and/or charge a tax, duty, fee or surcharge for transactions between buyers and sellers, or for ownership of virtual items, and/or other entities. For example, the one or more sales characteristics may be characteristics by which the offers to purchase a particular virtual item are to be ranked according to desirability.

In some implementations, a sales characteristic may be the total cost to a buying user (including any fees the buying user is or would be responsible for) for a particular purchase of a particular virtual item. In some implementations, a sales characteristic may be the revenue for a selling user (excluding any fees the selling user is or would be responsible for) for a particular sale of a particular virtual item. In some implementations, a sales characteristic may be the revenue for system 100 (excluding any fees system 100 is or would be responsible for) for a particular purchase of a particular virtual item. In some implementations, a sales characteristic may be the profit for system 100 (e.g., the revenue minus any fees system 100 is or would be responsible for) for a particular purchase of a particular virtual item. In some implementations, a sales characteristic may be the third-party fees associated with a particular purchase of a particular virtual item. By way of non-limiting example, third-party fees may include taxes, duties, fees or surcharges associated with the particular purchase. In some implementations, third-party fees may include fees for currency exchanges.

In some implementations, a sales characteristic may be based on multiple characteristics, such as, by way of non-limiting example, a ratio, a sum, and/or a difference. In some implementations, a sales characteristic may be (based on) a ratio of total cost to a buying user divided by third-party fees associated with the buying user purchasing a particular virtual item. For example, a first buying user may bid and/or offer a higher purchase price than a second buying user, but due to the respective third-party fees, the offer by the second buying user could be favored based on this ratio. In some implementations, a ratio may effectively favor efficiency in third-party fees. In some implementations, a sales characteristic may be (based on) a ratio of the profit to system 100 divided by third-party fees associated with the buying user purchasing a particular virtual item. For example, a first buying user may bid and/or offer a higher purchase price than a second buying user, but due to the respective third-party fees, the offer by the second buying user could be associated with a higher profit, and thus be favored based on this ratio. In some implementations, a sales characteristic may be (based on) a sum of the profit to system 100 and the revenue for the selling user of a particular sale of a particular virtual item. For example, a first buying user may bid and/or offer a higher purchase price than a second buying user, but due to, e.g., the respective third-party fees, the offer by the second buying user could be favored based on this sum. In some implementations, a sum may effectively favor efficiency in third-party fees and/or profitability for multiple stakeholders, including system 100.

In some implementations, system 100 may use multiple different exchange rates and/or fees for currency exchanges. For example, a first exchange rate may be used for a first buying user (or a first type of buying user) when calculating and/or otherwise determining one or more sales characteristics. A second exchange rate may be used (e.g., for the same purchase and/or transaction) when calculating and/or otherwise determining one or more other sales characteristics. For example, a first exchange rate may be used to determine the revenue for a selling user, and a second exchange rate may be used to determine certain third-party fees system 100 is or would be responsible for. For example, a first exchange rate may be used to determine the total cost for a buying user, and a second exchange rate may be used to determine certain third-party fees system 100 is or would be responsible for.

Desirability component 138 may be configured to determine metric values of offer desirability metrics. In some implementations, desirability component 138 may be configured to compare different metric values. In some implementations, determinations by desirability component 138 may be based on one or more sales characteristics. For example, determinations may be in accordance with a particular sales characteristic. For example, desirability component 138 may be configured to determine, for a first offer, a first metric value of a particular offer desirability metric. For example, desirability component 138 may be configured to determine, for a second offer, a second metric value of the particular offer desirability metric. In some implementations, an offer desirability metric may quantify, represent, and/or otherwise correspond to desirability of offers to purchase particular virtual items. In some implementations, determinations by desirability component 138 may be based at least in part on one or more factors pertaining to one or more of a ranking of the prospective buying users, a rating of the prospective buying users, and a reputation of the prospective buying users. For example, a first offer may include a higher purchase price than a second offer, but due to the respective reputations of the prospective buyers, the second metric value (corresponding to the second offer) may represent a more desirable offer than the first metric value corresponding to the first offer.

Winner component 120 may be configured to determine and/or decide an accepted offer (e.g., regarding the sale of a particular virtual item) that is accepted. In some implementations, winner component 120 may be configured to decide which of the received offers to purchase a particular virtual item will be accepted, or is intended to be accepted (barring any issues such as non-payment and/or other issues). The accepted offer (also referred to as "winning offer") for a particular virtual item may be exactly one of the offers to purchase the particular virtual item. Winner component 120 may be further configured to determine a buying user that provided the accepted offer. In some implementations, determinations and/or decisions regarding the accepted offer and/or the buying user may be based on one or more factors and/or considerations, including but not limited to sales characteristics (e.g., as obtained by sales information component 118), ranking/rating/reputation of prospective buyers, estimated and/or anticipated costs/fees/revenue/profit of prospective purchases to any or all of the pertinent parties in a transaction, chronological information, metric values of offer desirability metrics (e.g., as determined by desirability component 138), and/or other factors and considerations. For example, in some implementations, winner component 120 may be configured to determine the accepted offer based (at least in part) on the first offer that meets a certain target price. For example, in some implementations, winner component 120 may be configured to determine the accepted offer based (at least in part) on the highest offer received within the limited duration of an auction. For example, in some implementations, winner component 120 may be configured to determine the accepted offer based (at least in part) on the metric values of one or more offer desirability metrics, which may be determined in accordance with one or more sales characteristics.

In some implementations, winner component 120 may be configured to perform verifications pertaining to sales activities. For example, a verification may verify whether a particular sales request is associated with a user and/or a user account. For example, a verification may verify whether a particular sales request is associated with a user account of a user that is allowed to initiate sales transactions. In some implementations, determining the accepted offer may include a verification whether one or more requirements as stipulated by the selling user in the sales request have been met. For example, the one or more requirements may include geographical restrictions, restrictions related to in-game player statistics, the prospective buyer's spending history (and/or other parameters for the prospective buyer), and/or other restrictions. In some implementations, performance of one or more verifications may be based on information in the registry that is stored in decentralized database 135. In some implementations, decentralized database 135 may represent a blockchain, and a particular verification may be based on information in the registry that is stored in the blockchain.

Sale platform notification component 122 may be configured to notify online sales platforms 105. For example, a notification may indicate whether particular offers from prospective buyers have been accepted or denied. In some implementations, one or more online sales platforms 105 may remove, modify, deactivate, and/or otherwise change sales listings (and/or publications of sales listings), e.g., subsequent to notifications whether particular offers have been accepted or denied.

Consideration component 124 may be configured to receive amounts of consideration from buying users. Consideration may include fiat currency, cryptocurrency, virtual currency, and/or other types of currencies. Consideration component 124 may be configured to transfer payments between different accounts and/or different users, including a selling user account, a buying user account, and/or other user accounts. In some implementations, consideration component 124 may be configured to convert one or more currencies of a first type into one or more currencies of a second type. For example, in some implementations, received currency from the buyer may be converted to a preferred currency of the seller. In some implementations, a single prospective buyer may make multiple offers to purchase the same particular virtual item (e.g., through multiple online sales platforms 105) and may provide multiple corresponding amounts of consideration. For example, the particular consideration for a particular offer to buy that is not accepted may be returned to the prospective buyer.

In some implementations, consideration component 124 may receive payments on behalf of buyers, e.g. from one or more online sales platform 105. In some implementations, consideration component 124 may receive payments on behalf of sellers. In some implementations, consideration component 124 may be configured to transfer at least a portion of a sales amount received from a buying user to a selling user account. In some implementations, for example in case of a refund, consideration component 124 may be configured to receive at least a portion of the sales amount from the original selling user account. In some implementations, for example in case of a refund, consideration component 124 may be configured to transfer at least a portion of a sales amount to the original buying user account. Consideration component 124 may be configured to share portions of payments with other stakeholders, including but not limited to online sales platform 105 (e.g., a sales service fee or a transaction fee), gaming platform(s) 103, an original creator or designer of the sold virtual item, and/or other interested parties.

Buyer component 126 may be configured to identify accounts, including but not limited to user accounts of buyers of virtual items. For example, buyer component 126 may be configured to identify a buying user account of a buying user that has effectuated a purchase of a particular virtual item through a particular online sales platform 105. In some implementations, identification may be performed responsive to receipt of sales information indicating a particular virtual item has been purchased. The buying user account may include a buying user inventory of virtual items that are usable by the buying user within the online game. In some implementations, identifying the buying user account of the buying user may include generating a redemption code for the particular virtual item. In some implementations, assigning the ownership of the particular virtual item to the buying user account may be performed responsive to redemption of the redemption code, e.g., by the buyer. In some implementations, a buyer may have a user account with a particular online sales platform 105 (i.e., at the moment of the purchase of a particular virtual item), but not with a particular gaming platform 103. In such a case, buyer component 126 may be configured to facilitate the creation of a buying user account with a particular gaming platform 103. Once the buying user account is created and subsequently identified, ownership of a purchased virtual item may be assigned to the buying user account. The particular virtual item that may be included in the buying user inventory may be available to be used by the buying user within the online game.

In some implementations, ownership component 112 may be configured to effectuate assignment of the ownership of a particular virtual item to a particular buying user account, such that the particular virtual item is included in the particular buying user inventory. In some implementations, effectuating the assignment of the ownership of the particular virtual item to the buying user account may include assigning the ownership from the holding account to the particular buying user account.

Sharing component 130 may be configured to transfer at least a portion of the amount of consideration received from the buying user to the selling user account. In some implementations, sharing component 130 may be configured to share portions of payments with other stakeholders, including but not limited to online sales platform 105 (e.g., a sales service fee or a transaction fee), gaming platform(s) 103, an original creator or designer of the sold virtual item, the game developer or distributor, and/or other interested parties.

In some implementations, system 100 may include a game component configured to execute an instance of an online game within gaming platform 103. The game component may be configured to implement the instance of the online game by receiving and executing commands based on user input (e.g., from users, through client computing platforms 104). At least part of the online game may take place in a virtual space that includes a simulated topography. The user input may be received from users through client computing platforms 104 associated with the users. Execution of the commands may facilitate interactions between the users. The execution of the commands may further facilitate locomotion of the one or more game assets controlled by the one or more users within the simulated topography of the virtual space. Implementing the instance of the online game may include determining view information for presentation of the online game to the players on client computing platforms 104.

Figure 3A:
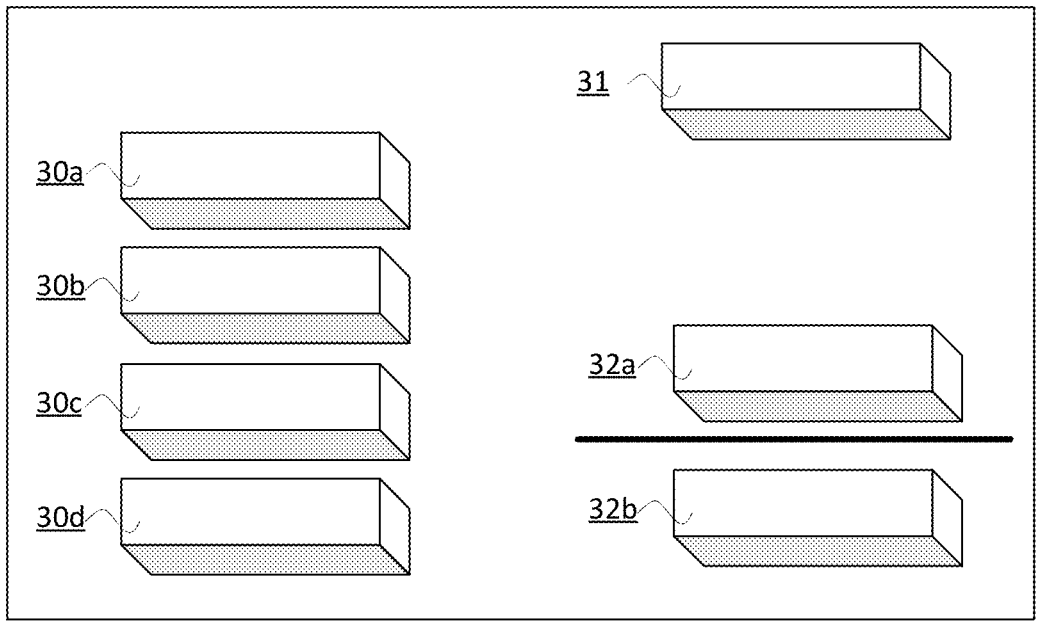
FIGS. 3A-3B illustrate exemplary user interfaces that may be used in a system for facilitating purchase offer selection across multiple online sales platforms, in accordance with one or more implementations.

By way of non-limiting example, FIG. 3A illustrates a user interface 137a that may be used in system 100. As depicted in FIG. 3A, user interface 137a may include graphical user interface elements configured to receive user input from users, e.g., enabling users to enter and/or select graphical user interface elements, values, and/or other information. For example, individual ones of element 30a, element 30b, element 30c, and element 30d may represent individual particular sales characteristics, such as total cost to a buyer, revenue for a seller, revenue for the system, profit for the system, third-party fees. Element 31 may represent a type and/or formula for determining a sales characteristic that is based on multiple factors. For example, a user may use element 31 to select a ratio-type of sales characteristic, which may be subsequently represented by elements 32a and 32b. The user may drag and drop one or more of elements 30a-30b into the slots or places of elements 32a-32b, and by doing so select a particular ratio as the particular (compound) sales characteristic to be used by system 100 to rank purchase offers according to desirability.

Figure 3B:
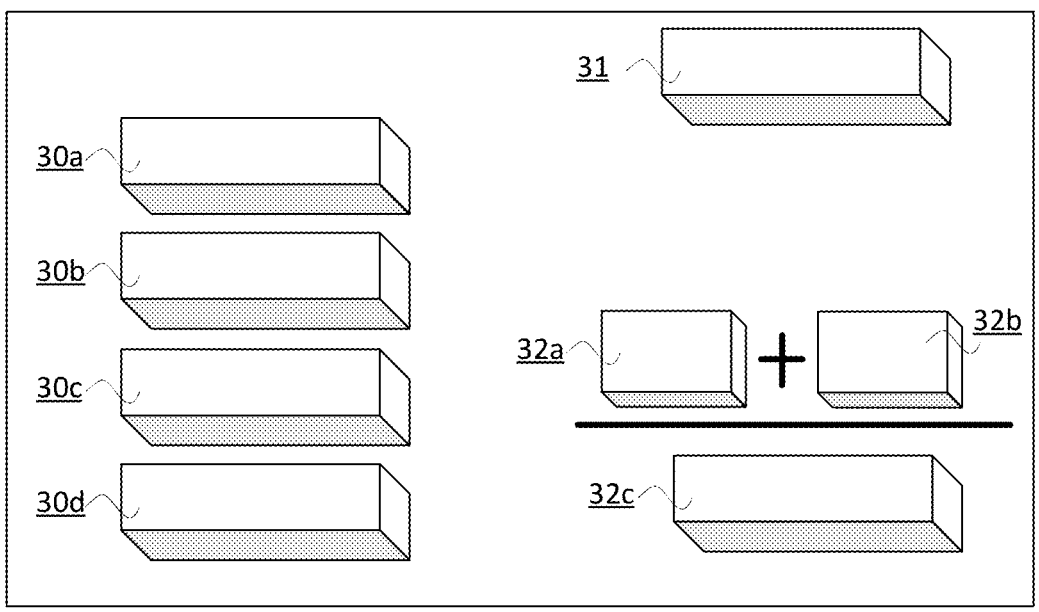

By way of non-limiting example, FIG. 3B illustrates a user interface 137b that may be used in system 100. As depicted in FIG. 3B, user interface 137b may include graphical user interface elements configured to receive user input from users, e.g., enabling users to enter and/or select graphical user interface elements, values, and/or other information. By way of non-limiting example, individual ones of element 30a, element 30b, element 30c, and element 30d may represent individual particular sales characteristics, such as total cost to a buyer, revenue for a seller, revenue for the system, profit for the system, third-party fees. Element 31 may represent a type and/or formula for determining a sales characteristic that is based on multiple factors. For example, a user may use element 31 to select a sum-and-ratio-type of compound sales characteristic, which may be subsequently represented by elements 32a, 32b, and 32c. The user may drag and drop one or more of elements 30a-30b into the slots or places of elements 32a-32c, and by doing so select a particular sum-and-ratio (i.e., the sum of elements 32a and 32b, divided by element 32c) as the particular (compound) sales characteristic to be used by system 100 to rank purchase offers according to desirability.

Referring to FIG. 1, selling information request component 132 may be configured to request, from a selling user, selling information related to the sale of a particular virtual item. In some implementations, generation of one or more of the sales listings (e.g., by listing component 114) may be based on information requested by selling information request component 132, such as, e.g., selling information. In some implementations, receipt of the selling information may confirm the selling user consents to the publications of the sales listings.

User input component 128 may be configured to receive user input from users, for example through client computing platforms 104. In some implementations, user input component may receive user input from a selling user, a buying user, and/or other users. For example, user input may confirm a selling user's consent to offer a particular virtual item for sale, and/or publish a particular sales listing. In some implementations, publication of one or more sales listings may be effectuated subsequent to receipt of particular user input from the selling user. In some implementations, user input component 132 may be implemented through user interfaces 137.

User interfaces 137 may be configured to facilitate interaction between users and system 100 and/or between users and client computing platforms 104. For example, user interfaces 137 may provide interfaces through which users may provide information to and/or receive information from system 100. In some implementations, a particular user interface 137 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 137 may be included in one or more client computing platforms 104. In some implementations, one or more user interfaces 137 may be included in system 100.

In some implementations, server(s) 102, client computing platform(s) 104, and/or external resources 133 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 133 may be operatively linked via some other communication media.

A given client computing platform 104 may include one or more processors configured to execute computer program components. The computer program components may be configured to enable an expert or user associated with the given client computing platform 104 to interface with system 100 and/or external resources 133, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 133 may include sources of information outside of system 100, external entities participating with system 100, and/or other resources. In some implementations, some or all of the functionality attributed herein to external resources 133 may be provided by resources included in system 100.

Server(s) 102 may include electronic storage 139, one or more processors 140, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 139 may comprise non-transitory storage media that electronically stores information. The electronic storage media of electronic storage 139 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 139 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 139 may include one or more virtual storage resources (e.g., cloud storage, a virtual private network, and/or other virtual storage resources). Electronic storage 139 may store software algorithms, information determined by processor(s) 140, information received from server(s) 102, information received from client computing platform(s) 104, and/or other information that enables server(s) 102 to function as described herein.

Processor(s) 140 may be configured to provide information processing capabilities in server(s) 102. As such, processor(s) 140 may include one or more of a digital processor, an analog processor, a digital circuit designed to process information, an analog circuit designed to process information, a state machine, and/or other mechanisms for electronically processing information. Although processor(s) 140 is shown in FIG. 1 as a single entity, this is for illustrative purposes only. In some implementations, processor(s) 140 may include a plurality of processing units. These processing units may be physically located within the same device, or processor(s) 140 may represent processing functionality of a plurality of devices operating in coordination. Processor(s) 140 may be configured to execute components 108, 110, 112, 114, 116, 118, 120, 122, 124, 126, 128, 130, 132, 134, 136, and/or 138, and/or other components. Processor(s) 140 may be configured to execute components 108, 110, 112, 114, 116, 118, 120, 122, 124, 126, 128, 130, 132, 134, 136, and/or 138, and/or other components by software; hardware; firmware; some combination of software, hardware, and/or firmware; and/or other mechanisms for configuring processing capabilities on processor(s) 140. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, 126, 128, 130, 132, 134, 136, and/or 138 are illustrated in FIG. 1 as being implemented within a single processing unit, in implementations in which processor(s) 140 includes multiple processing units, one or more of components 108, 110, 112, 114, 116, 118, 120, 122, 124, 126, 128, 130, 132, 134, 136, and/or 138 may be implemented remotely from the other components. The description of the functionality provided by the different components 108, 110, 112, 114, 116, 118, 120, 122, 124, 126, 128, 130, 132, 134, 136, and/or 138 described below is for illustrative purposes, and is not intended to be limiting, as any of components 108, 110, 112, 114, 116, 118, 120, 122, 124, 126, 128, 130, 132, 134, 136, and/or 138 may provide more or less functionality than is described. For example, one or more of components 108, 110, 112, 114, 116, 118, 120, 122, 124, 126, 128, 130, 132, 134, 136, and/or 138 may be eliminated, and some or all of its functionality may be provided by other ones of components 108, 110, 112, 114, 116, 118, 120, 122, 124, 126, 128, 130, 132, 134, 136, and/or 138. As another example, processor(s) 140 may be configured to execute one or more additional components that may perform some or all of the functionality attributed below to one of components 108, 110, 112, 114, 116, 118, 120, 122, 124, 126, 128, 130, 132, 134, 136, and/or 138.

Figure 2:
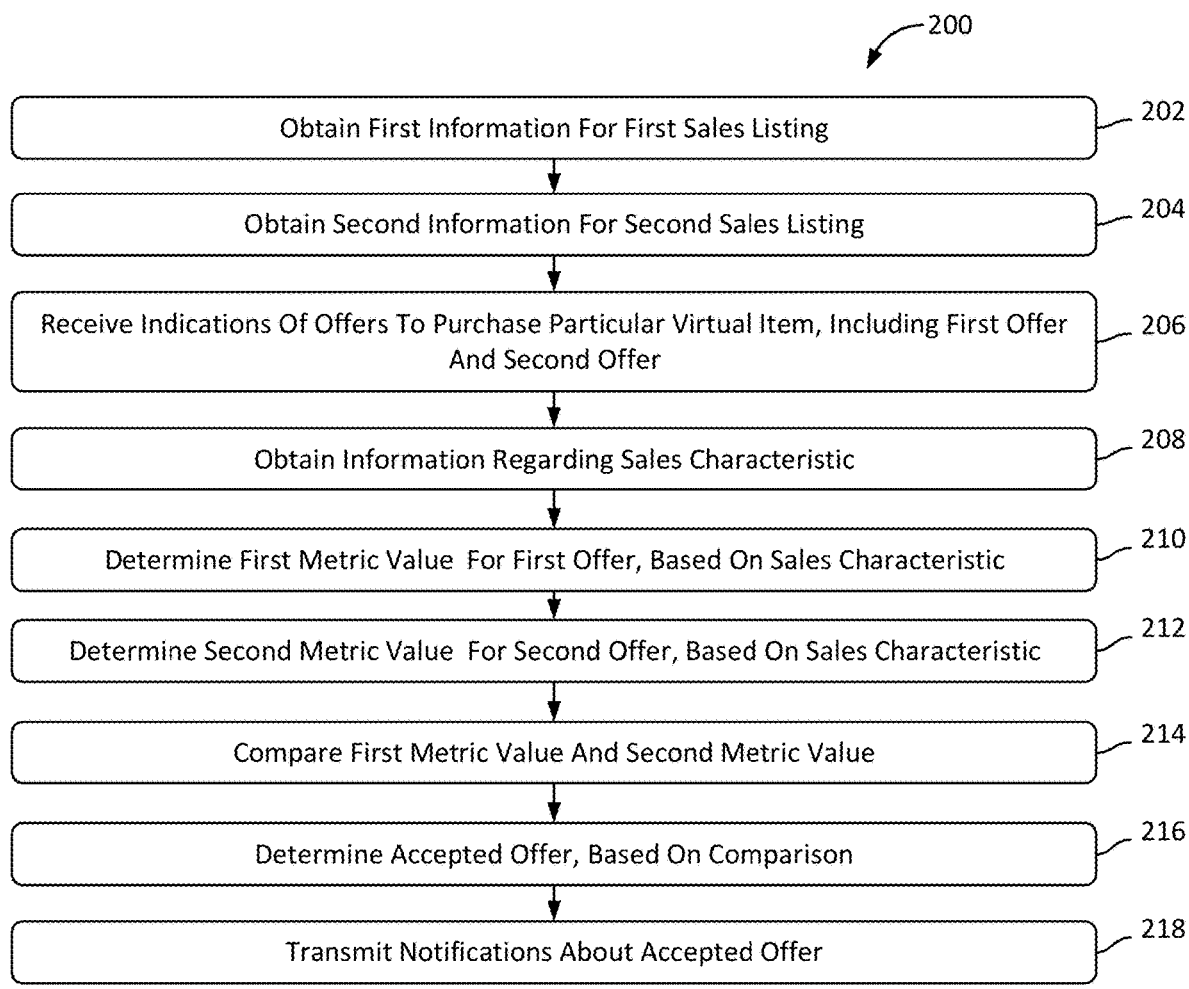
FIG. 2 illustrates a method for facilitating purchase offer selection across multiple online sales platforms, in accordance with one or more implementations.

FIG. 2 illustrates a method 200 for facilitating purchase offer selection across multiple online sales platforms, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, first information is obtained defining a first sales listing of a particular virtual item on a first online sales platform. The first online sales platform is configured to allow buyers to make purchases using a fiat currency. The first information further defines first pricing information for prospective buying users and first descriptive information that describes the particular virtual item offered for sale for the first sales listing. In some embodiments, operation 202 is performed by a sales information component the same as or similar to sales information component 118 (shown in FIG. 1 and described herein).

At an operation 204, second information is obtained defining a second sales listing of the particular virtual item on a second online sales platform. The second online sales platform is configured to allow buyers to make purchases using a cryptocurrency. The second information further defines second pricing information for prospective buying users and second descriptive information that describes the particular virtual item offered for sale for the second sales listing. In some embodiments, operation 204 is performed by a sales information component the same as or similar to sales information component 118 (shown in FIG. 1 and described herein).

At an operation 206, at least two indications are received of offers to purchase the particular virtual item. The at least two indications of the offers include a first indication of a first offer received through the first online sales platform from a first prospective buying user and a second indication of a second offer received through the second online sales platform from a second prospective buying user. In some embodiments, operation 206 is performed by a sales information component the same as or similar to sales information component 118 (shown in FIG. 1 and described herein).

At an operation 208, information is obtained that represents at least one sales characteristic by which the offers to purchase the particular virtual item are to be ranked according to desirability. In some embodiments, operation 208 is performed by a sales information component the same as or similar to sales information component 118 (shown in FIG. 1 and described herein).

At an operation 210, for the first offer, a first metric value is determined of an offer desirability metric that quantifies desirability of offers to purchase the particular virtual item. The first metric value is determined in accordance with the at least one sales characteristic. In some embodiments, operation 210 is performed by a desirability component the same as or similar to desirability component 138 (shown in FIG. 1 and described herein).

At an operation 212, for the second offer, a second metric value is determined of the offer desirability metric. The second metric value is determined in accordance with the at least one sales characteristic. In some embodiments, operation 212 is performed by a desirability component the same as or similar to desirability component 138 (shown in FIG. 1 and described herein).

At an operation 214, the first metric value is compared with the second metric value. In some embodiments, operation 214 is performed by a desirability component the same as or similar to desirability component 138 (shown in FIG. 1 and described herein).

At an operation 216, an accepted offer is determined that is accepted. The accepted offer is based on the comparison of the first metric value with the second metric value. The accepted offer is either the first offer or the second offer. In some embodiments, operation 216 is performed by a winner component the same as or similar to winner component 120 (shown in FIG. 1 and described herein).

At an operation 218, transmissions of notifications may be effectuated to the first prospective buying user and the second prospective buying user that represent whether their respective offers have been accepted. In some embodiments, operation 218 is performed by a sale platform notification component the same as or similar to sale platform notification component 122 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for facilitating purchase offer selection across multiple online sales platforms, the system comprising:
   one or more hardware processors configured by machine-readable instructions to:
      obtain first information defining a first sales listing of a particular virtual item on a first online sales platform, wherein the first online sales platform is configured to allow buyers to make purchases using a fiat currency, wherein the first information further defines first pricing information for prospective buying users and first descriptive information that describes the particular virtual item offered for sale for the first sales listing;
      obtain second information defining a second sales listing of the particular virtual item on a second online sales platform, wherein the second online sales platform is configured to allow buyers to make purchases using a cryptocurrency, wherein the second information further defines second pricing information for prospective buying users and second descriptive information that describes the particular virtual item offered for sale for the second sales listing;
      receive at least two indications of offers to purchase the particular virtual item, wherein the at least two indications of the offers include a first indication of a first offer received through the first online sales platform from a first prospective buying user and a second indication of a second offer received through the second online sales platform from a second prospective buying user;
      obtain information that represents at least one sales characteristic by which the offers to purchase the particular virtual item are to be ranked according to desirability;
      determine, for the first offer, a first metric value of an offer desirability metric that quantifies desirability of offers to purchase the particular virtual item, wherein the first metric value is determined in accordance with the at least one sales characteristic;
      determine, for the second offer, a second metric value of the offer desirability metric, wherein the second metric value is determined in accordance with the at least one sales characteristic;
      compare the first metric value with the second metric value;
      determine an accepted offer that is accepted, wherein the accepted offer is based on the comparison of the first metric value with the second metric value, wherein the accepted offer is either the first offer or the second offer; and
      effectuate transmissions of notifications to the first prospective buying user and the second prospective buying user that represent whether their respective offers have been accepted.

2. The system of claim 1, wherein the particular virtual item is offered for sale through both the first sales listing and through the second sales listing by a selling user.

3. The system of claim 1, wherein the particular virtual item is usable within an online game.

4. The system of claim 1, wherein the at least one sales characteristic is one or more of:
   (i) a first ratio of cost to a buying user divided by third-party fees associated with the buying user purchasing the particular virtual item, and
   (ii) a second ratio of profit for the system divided by the third-party fees associated with the buying user purchasing the particular virtual item, and
   (iii) a sum of profit for the system and revenue for a selling user,
   wherein the buying user made the accepted offer to purchase the particular virtual item.

5. The system of claim 1, wherein the first metric value is based at least in part on one or more factors pertaining to one or more of a ranking of the prospective buying users, a rating of the prospective buying users, and a reputation of the prospective buying users.

6. The system of claim 2, wherein the one or more hardware processors are further configured to:
   receive an amount of consideration from a buying user, wherein the buying user made the accepted offer to purchase the particular virtual item;
   effectuate assignment of ownership of the particular virtual item to an account of the buying user; and
   transfer at least a portion of the amount of consideration received from the buying user to the selling user.

7. The system of claim 1, wherein the one or more hardware processors are further configured to:
   manage user accounts for users in the online game, wherein individual user accounts are associated with individual users, wherein the individual user accounts include individual user inventories of virtual items that are usable within the online game by the associated users, wherein the users include a selling user associated with a selling user account, a first prospective buying user associated with a first buying user account, and a second prospective buying user associated with a second buying user account, wherein the selling user account includes a selling user inventory of one or more virtual items that are usable by the selling user within the online game, wherein the first prospective buying user account includes a first buying user inventory of one or more virtual items that are usable by the first prospective buying user within the online game, and wherein the second prospective buying user account includes a second buying user inventory of one or more virtual items that are usable by the second prospective buying user within the online game.

8. The system of claim 1, wherein determining the accepted offer includes a verification whether one or more requirements as stipulated by a selling user have been met.

9. The system of claim 6, wherein assignments of the ownership of the particular virtual item are recorded on a decentralized database that stores a registry of assets and transactions, wherein the assets include the particular virtual item, wherein the decentralized database represents a blockchain, wherein the assignment of the ownership is effectuated subsequent to a verification that the selling user has ownership of the particular virtual item prior to the purchase, and wherein the verification is based on information in the registry that is stored in the decentralized database.

10. The system of claim 1, wherein determining the second metric value includes converting price information regarding the second offer to the fiat currency.

11. A method for facilitating purchase offer selection across multiple online sales platforms, the method comprising:
   obtaining first information defining a first sales listing of a particular virtual item on a first online sales platform, wherein the first online sales platform is configured to allow buyers to make purchases using a fiat currency, wherein the first information further defines first pricing information for prospective buying users and first descriptive information that describes the particular virtual item offered for sale for the first sales listing;
   obtaining second information defining a second sales listing of the particular virtual item on a second online sales platform, wherein the second online sales platform is configured to allow buyers to make purchases using a cryptocurrency, wherein the second information further defines second pricing information for prospective buying users and second descriptive information that describes the particular virtual item offered for sale for the second sales listing;
   receiving at least two indications of offers to purchase the particular virtual item, wherein the at least two indications of the offers include a first indication of a first offer received through the first online sales platform from a first prospective buying user and a second indication of a second offer received through the second online sales platform from a second prospective buying user;
   obtaining information that represents at least one sales characteristic by which the offers to purchase the particular virtual item are to be ranked according to desirability;
   determining, for the first offer, a first metric value of an offer desirability metric that quantifies desirability of offers to purchase the particular virtual item, wherein the first metric value is determined in accordance with the at least one sales characteristic;
   determining, for the second offer, a second metric value of the offer desirability metric, wherein the second metric value is determined in accordance with the at least one sales characteristic;
   comparing the first metric value with the second metric value;
   determining an accepted offer that is accepted, wherein the accepted offer is based on the comparison of the first metric value with the second metric value, wherein the accepted offer is either the first offer or the second offer; and
   effectuating transmissions of notifications to the first prospective buying user and the second prospective buying user that represent whether their respective offers have been accepted.

12. The method of claim 11, wherein the particular virtual item is offered for sale through both the first sales listing and through the second sales listing by a selling user.

13. The method of claim 11, wherein the particular virtual item is usable within an online game.

14. The method of claim 11, wherein the at least one sales characteristic is one or more of:
   (i) a first ratio of cost to a buying user divided by third-party fees associated with the buying user purchasing the particular virtual item, and
   (ii) a second ratio of profit for the system divided by the third-party fees associated with the buying user purchasing the particular virtual item, and
   (iii) a sum of profit for the system and revenue for a selling user,
   wherein the buying user made the accepted offer to purchase the particular virtual item.

15. The method of claim 11, wherein the first metric value is based at least in part on one or more factors pertaining to one or more of a ranking of the prospective buying users, a rating of the prospective buying users, and a reputation of the prospective buying users.

16. The method of claim 12, further comprising:
   receiving an amount of consideration from a buying user, wherein the buying user made the accepted offer to purchase the particular virtual item;
   effectuating assignment of ownership of the particular virtual item to an account of the buying user; and
   transferring at least a portion of the amount of consideration received from the buying user to the selling user.

17. The method of claim 11, further comprising:
   managing user accounts for users in the online game, wherein individual user accounts are associated with individual users, wherein the individual user accounts include individual user inventories of virtual items that are usable within the online game by the associated users, wherein the users include a selling user associated with a selling user account, a first prospective buying user associated with a first buying user account, and a second prospective buying user associated with a second buying user account, wherein the selling user account includes a selling user inventory of one or more virtual items that are usable by the selling user within the online game, wherein the first prospective buying user account includes a first buying user inventory of one or more virtual items that are usable by the first prospective buying user within the online game, and wherein the second prospective buying user account includes a second buying user inventory of one or more virtual items that are usable by the second prospective buying user within the online game.

18. The method of claim 11, wherein determining the accepted offer includes a verification whether one or more requirements as stipulated by a selling user have been met.

19. The method of claim 16, wherein assignments of the ownership of the particular virtual item are recorded on a decentralized database that stores a registry of assets and transactions, wherein the assets include the particular virtual item, wherein the decentralized database represents a blockchain, wherein the assignment of the ownership is effectuated subsequent to a verification that the selling user has ownership of the particular virtual item prior to the purchase, and wherein the verification is based on information in the registry that is stored in the decentralized database.

20. The method of claim 11, wherein determining the second metric value includes converting price information regarding the second offer to the fiat currency.

* * * * *